United States Patent
Gilbride

(10) Patent No.: US 12,533,162 B2
(45) Date of Patent: Jan. 27, 2026

(54) SACRO-ILIAC FUSION SYSTEMS AND METHODS

(71) Applicant: Charles Gilbride, Salinas, CA (US)

(72) Inventor: Charles Gilbride, Salinas, CA (US)

( * ) Notice: Subject to any disclaimer, the term of this patent is extended or adjusted under 35 U.S.C. 154(b) by 390 days.

(21) Appl. No.: 17/767,983

(22) PCT Filed: Oct. 22, 2020

(86) PCT No.: PCT/US2020/056845
§ 371 (c)(1),
(2) Date: Apr. 11, 2022

(87) PCT Pub. No.: WO2021/081192
PCT Pub. Date: Apr. 29, 2021

(65) Prior Publication Data
US 2024/0081873 A1   Mar. 14, 2024

Related U.S. Application Data

(60) Provisional application No. 62/924,638, filed on Oct. 22, 2019.

(51) Int. Cl.
*A61B 17/70* (2006.01)
*A61B 17/84* (2006.01)

(52) U.S. Cl.
CPC ........ *A61B 17/7055* (2013.01); *A61B 17/844* (2013.01)

(58) Field of Classification Search
CPC . A61B 17/7055; A61B 17/844; A61F 2/4455; A61F 2/446; A61F 2/4465; A61F 2/447; A61F 2002/30995
See application file for complete search history.

(56) References Cited

U.S. PATENT DOCUMENTS

| | | | |
|---|---|---|---|
| 5,702,215 A * | 12/1997 | Li | F16B 13/0866 411/24 |
| 6,053,916 A | 4/2000 | Moore | |
| 8,075,593 B2 * | 12/2011 | Hess | A61B 17/7065 606/248 |
| 8,142,479 B2 * | 3/2012 | Hess | A61B 17/7065 606/248 |
| 9,017,407 B2 | 4/2015 | Donner | |
| 9,095,383 B2 * | 8/2015 | Aschmann | A61B 17/7065 |
| 9,113,972 B2 * | 8/2015 | Trudeau | A61B 17/8625 |
| 9,421,109 B2 * | 8/2016 | Donner | A61B 17/844 |
| 10,864,029 B2 | 12/2020 | Redmond et al. | |
| 2012/0083883 A1 * | 4/2012 | Ginn | A61B 17/1604 623/17.11 |
| 2017/0258498 A1 * | 9/2017 | Redmond | A61B 17/7055 |
| 2019/0231405 A1 * | 8/2019 | Redmond | A61B 17/7055 |
| 2019/0388078 A1 * | 12/2019 | Otto | A61B 90/06 |

* cited by examiner

*Primary Examiner* — Tracy L Kamikawa
(74) *Attorney, Agent, or Firm* — David Meibos; Maywood IP Law

(57) ABSTRACT

A system may be used to secure an ilium to a sacrum. The system may include an implant configured to pass through an access pathway to an implantation site between the ilium and the sacrum. The system may also include one or more anchors that are deployable outward from the implant and into the sacrum and/or the ilium proximate the implant to retain the implant relative to the ilium and/or the sacrum.

16 Claims, 6 Drawing Sheets

SACRO-ILIAC FUSION SYSTEMS AND METHODS

CROSS-REFERENCE TO RELATED APPLICATIONS

This application is a U.S. national stage filing under 35 U.S.C. § 371 of International Application No. PCT/US2020/056845, filed on Oct. 22, 2020, which claims the benefit of U.S. Provisional Application No. 62/924,638, filed on Oct. 22, 2019. All of the foregoing are incorporated as though set forth herein in their entirety.

TECHNICAL FIELD

The present disclosure relates to orthopedic medical implants and instruments. More specifically, the present disclosure relates to implants and instruments for sacro-iliac fusion.

BACKGROUND

Current technologies for attaching bones together are limited in many respects. Many known procedures are too complex, time-consuming, or expensive. Some result in excessive post-operative pain or recovery periods. Furthermore, some known bone attachment systems may not provide sufficiently secure fixation to prevent post-operative motion, and ultimately, failure of the attachment.

SUMMARY

The various medical devices, systems, and methods of the present disclosure have been developed in response to the present state of the art, and in particular, in response to the problems and needs in the art that have not yet been fully solved by currently available medical devices, systems, and methods for promoting fusion between adjacent bones, such as the sacrum and the ilium.

In some embodiments, a system may be used to secure an ilium to a sacrum. The system may include an implant configured to pass through an access pathway to an implantation site between the ilium and the sacrum. The system may also include one or more anchors that are deployable outward from the implant and into the sacrum and/or the ilium proximate the implant to retain the implant relative to the ilium and/or the sacrum.

The access pathway may extend through the ilium to reach the sacrum. The implant may have a distal end positionable within the sacrum and a proximal end positionable within the ilium.

The implant may have a body that defines an interior cavity. The one or more anchors may have distal ends that are movable out of the interior cavity and into the ilium and/or the sacrum during deployment of the one or more anchors.

The system may further have a cartridge that carries the one or more anchors and carried within the interior cavity. The one or more anchors may be deployable outward from the implant by deploying the one or more anchors outward from the cartridge.

The system may further have a sterile package containing the cartridge and the one or more anchors preloaded in the cartridge.

The cartridge may be configured to be removable from the interior cavity after deployment of the one or more anchors outward from the cartridge.

The system may further have an inserter to which the implant is securable such that the inserter can be used to insert the implant through the access pathway. The implant may be detachable from the inserter after deployment of the one or more anchors outward from the cartridge. The cartridge may be securable to the inserter such that the cartridge is removable from the interior cavity by withdrawing the inserter from the implantation site with the cartridge secured to the inserter.

The one or more anchors may include one or more spikes, each of which has a distal end shaped to penetrate bone.

The body may have one or more openings, each of which is aligned with one of the one or more spikes. The one or more spikes may be deployable outward from the implant by deploying each of the one or more spikes through one of the one or more openings.

Each of the one or more spikes may have a shape that extends along a curved pathway. The one or more spikes may be deployable outward from the implant by rotating each of the one or more spikes as the one or more spikes penetrate the ilium and/or the sacrum.

The system may further have a deployment mechanism to which each of the one or more spikes is coupled. The one or more spikes may be deployable outward from the implant by actuating the deployment mechanism to move the one or more spikes.

The system may further have a cartridge that carries the one or more anchors and carried within the interior cavity. The deployment mechanism may be incorporated into the cartridge.

The one or more spikes may include a first spike and a second spike. The one or more spikes may be deployable outward from the implant such that the first spike penetrates the ilium, and the second spike penetrates the sacrum.

The one or more spikes may further include a third spike and a fourth spike. The one or more spikes may be deployable outward from the implant such that the third spike penetrates the ilium, and the fourth spike penetrates the sacrum. The one or more spikes may further be deployable outward from the implant such that the third spike and the fourth spike deploy from a second side of the implant, opposite to a first side of the implant from which the first spike and the second spike deploy.

The body and/or the one or more anchors may include one or more retention features. The one or more anchors may be deployable outward from the implant such that the one or more retention features engage the body and/or the one or more anchors to prevent reversal of deployment.

The body may have a first retention feature. The one or more anchors may have a second retention feature. The one or more anchors may be deployable outward from the implant such that the first retention feature interlocks with the second retention feature to prevent reversal of deployment.

According to one embodiment, a method may be used to secure an ilium to a sacrum. The method may include providing an access pathway to an implantation site between the ilium and the sacrum and inserting an implant through the access pathway to position the implant at the implantation site. The method may further include deploying one or more anchors outward from the implant and into the sacrum and/or the ilium proximate the implant to retain the implant relative to the ilium and/or the sacrum.

Providing the access pathway may include forming the access pathway through the ilium to reach the sacrum. Positioning the implant at the implantation site may include positioning a distal end of the implant within the sacrum and positioning a proximal end of the implant within the ilium.

The implant may include a body that defines an interior cavity. Deploying the one or more anchors outward from the implant may include moving distal ends of the one or more anchors out of the interior cavity and into the ilium and/or the sacrum.

Positioning the implant at the implantation site may include positioning a cartridge, carrying the one or more anchors and carried within the interior cavity, at the implantation site. Deploying the one or more anchors outward from the implant may include deploying the one or more anchors outward from the cartridge.

The method may further include, prior to inserting the implant through the access pathway, opening a sterile package containing the cartridge and the one or more anchors preloaded in the cartridge.

The method may further include, after deploying the one or more anchors outward from the cartridge, removing the cartridge from the interior cavity.

The method may further include, prior to inserting the implant through the access pathway, securing the implant to an inserter, and after deploying the one or more anchors outward from the cartridge, detaching the implant from the inserter. Removing the cartridge from the interior cavity may include withdrawing the inserter from the implantation site with the cartridge secured to the inserter.

The one or more anchors may include one or more spikes, each of which has a distal end shaped to penetrate bone.

The body may have one or more openings, each of which is aligned with one of the one or more spikes. Deploying the one or more spikes outward from the implant may include deploying each of the one or more spikes through one of the one or more openings.

Each of the one or more spikes may have a shape that extends along a curved pathway. Deploying the one or more spikes outward from the implant may include rotating each of the one or more spikes as the one or more spikes penetrate the ilium and/or the sacrum.

Each of the one or more spikes may be coupled to a deployment mechanism. Deploying the one or more spikes outward from the implant may include actuating the deployment mechanism to move the one or more spikes.

Positioning the implant at the implantation site may include positioning a cartridge, carrying the one or more spikes and carried within the interior cavity, at the implantation site. The deployment mechanism may be incorporated into the cartridge.

The one or more spikes may include a first spike and a second spike. Deploying the one or more spikes outward from the implant may include penetrating the ilium with the first spike and penetrating the sacrum with the second spike.

The one or more spikes may further include a third spike and a fourth spike. Deploying the one or more spikes outward from the implant may include penetrating the ilium with the third spike and penetrating the sacrum with the fourth spike. Deploying the one or more spikes outward from the implant may further include deploying the third spike and the fourth spike from a second side of the implant, opposite to a first side of the implant from which the first spike and the second spike deploy.

The body and/or the one or more anchors may have one or more retention features. Deploying the one or more anchors outward from the implant may include causing the one or more retention features to engage the body and/or the one or more anchors to prevent reversal of deployment.

The body may have a first retention feature. The one or more anchors may have a second retention feature. Deploying the one or more anchors outward from the implant may include causing the first retention feature to interlock with the second retention feature to prevent reversal of deployment.

BRIEF DESCRIPTION OF THE DRAWINGS

Exemplary embodiments of the present disclosure will become more fully apparent from the following description and appended claims, taken in conjunction with the accompanying drawings. Understanding that these drawings depict only exemplary embodiments and are, therefore, not to be considered limiting of the scope of the appended claims, the exemplary embodiments of the present disclosure will be described with additional specificity and detail through use of the accompanying drawings in which:

DETAILED DESCRIPTION

Exemplary embodiments of the disclosure will be best understood by reference to the drawings, wherein like parts are designated by like numerals throughout. It will be readily understood that the components, as generally described and illustrated in the Figures herein, could be arranged and designed in a wide variety of different configurations. Thus, the following more detailed description of the embodiments of the apparatus, system, and method, as represented in FIGS. 1A through 5, is not intended to limit the scope of the disclosure, but is merely representative of exemplary embodiments.

Standard medical directions, planes of reference, and descriptive terminology are employed in this specification. For example, anterior means toward the front of the body. Posterior means toward the back of the body. Superior, or caudal, means toward the head. Inferior, or cephalad, means toward the feet. Medial means toward the midline of the body. Lateral means away from the midline of the body. Axial means toward a central axis of the body. Abaxial means away from a central axis of the body. Ipsilateral means on the same side of the body. Contralateral means on the opposite side of the body. A sagittal plane divides a body into right and left portions. A midsagittal plane divides the body into bilaterally symmetric right and left halves. A coronal plane divides a body into anterior and posterior portions. A transverse plane divides a body into superior and inferior portions. These descriptive terms may be applied to an animate or inanimate body.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The present disclosure discloses sacro-iliac fusion systems and methods. Such systems and methods may be designed to secure the ilium and the sacrum together. Of course, the systems and method provided herein may be used in connection with other joints and/or bones of the body.

Figure 1:
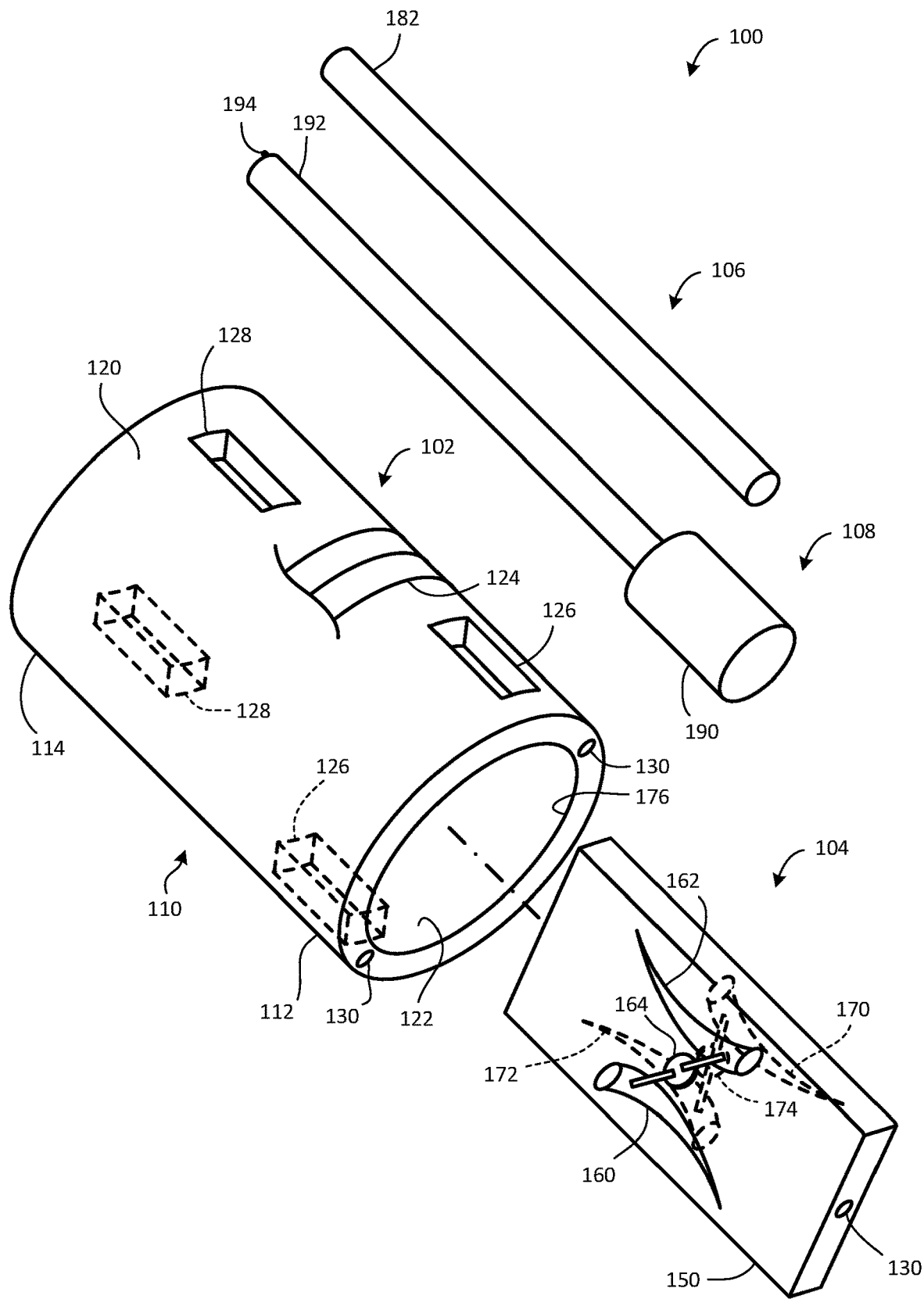
FIG. 1 is an exploded view of a system for carrying out sacroiliac fusion (or fusion of a different joint or set of bones), according to one embodiment.

FIG. 1 is an exploded view of a system 100 for carrying out sacroiliac fusion (or fusion of a different joint or set of bones), according to one embodiment. The system 100 may include an implant 102, a cartridge 104, a drill 106, and an inserter 108. These parts are not shown to scale. The implant 102 may be inserted into a space between the sacrum and the ilium. The cartridge 104 may be positioned within the implant 102 and actuated to secure the implant 102 to the ilium and/or the sacrum. The drill 106 may be used to form an access pathway to the implantation site, and the inserter 108 may be used to insert the implant 102 and/or the cartridge 104 into the implantation site.

The implant 102 may be designed to anchor in the space between the ilium and the sacrum. The implant 102 may have a body 110 with a generally tubular shape, with a proximal end 112 and a distal end 114. The body 110 may further have an exterior surface 120 with a generally cylindrical shape, and an interior cavity 122, which may extend for part or all of its length. The exterior surface 120 may have threads 124 that extend for part or all of its length. The threads 124 may be designed to engage the surrounding bone of the sacrum and/or the ilium. Thus, the body 110 may be rotatable, like a screw, into engagement with the surrounding bone. The threads 124 may be self-tapping, or may be shaped to be used in connection with a separate tapping tool (not shown) that forms threads in the surrounding bone, prior to implantation of the body 110, to receive the threads 124 of the body 110.

The body 110 may further have one or more proximal openings 126 and one or more distal openings 128 that provide passage from the interior cavity 122 to the exterior of the body 110. In the example of FIG. 1, two proximal openings 126 and two distal openings 128 are shown. Upon implantation of the implant 102, the proximal openings 126 may face outward toward the surrounding bone of the sacrum, and the distal openings 128 may face outward toward the surrounding bone of the ilium.

The body 110 may further have one or more retention features 130 that facilitate attachment of the body 110 to the inserter 108. The retention features 130 may be any known type of attachment mechanism, including but not limited to clips, clamps, threaded fittings, bayonet fittings, and the like. The retention features 130 may provide releasable attachment so that the implant 102 can be positioned in the desired location using the inserter 108, and then detached from the inserter 108.

The cartridge 104 may carry one or more anchors that can be deployed from the cartridge 104 to engage the sacrum and/or the ilium and keep the implant 102 in place. In some embodiments, the cartridge 104 may carry one or more anchors deployable into the ilium, and one or more anchors deployable into the sacrum. Any type of anchors may be used, including but not limited to various threaded and unthreaded fasteners. For example, the anchors may be spikes or screws.

In the exemplary embodiment of FIG. 1, the cartridge 104 may have a body 150 that carries the anchors. The body 150 may have any of a variety of configurations, including various polygonal, cylindrical, tubular, or other shapes. The body 150 may optionally be shaped to fit into the interior cavity 122 of the body 110 of the implant 102 so that the anchors can be deployed outward, through the proximal openings 126 and the distal openings 128, into the surrounding bone. As show in FIG. 1, the body 150 may be a rectangular prism with two opposing sides.

The cartridge 104 may further have anchors in the form of a first spike 160 and a second spike 162 on a first side of the body 150. The first spike 160 and the second spike 162 may be deployable through one of the proximal openings 126 and one of the distal openings 128, respectively, through the use of a first deployment mechanism 164. The first spike 160 and the second spike 162 may have any of various shapes, including rectilinear and curvilinear shapes. As embodied in FIG. 1, the first spike 160 and the second spike 162 are curved and tapered. Such a shape may be advantageous where the first spike 160 and the second spike 162 rotate during deployment.

The first deployment mechanism 164 may be designed to receive an input force (for example, through the inserter 108) and in response, drive the first spike 160 and the second spike 162 outward, such that the tips of the first spike 160 and the second spike 162 penetrate the bone of the sacrum and the ilium, respectively. In the alternative, the first deployment mechanism 164 may be omitted and/or located elsewhere (for example, in the inserter 108). In some embodiments, a deployment mechanism may not be needed; rather, the inserter 108 (or another deployment tool) may directly engage anchors such as the first spike 160 and the second spike 162 to urge them to deploy into the surrounding bone. In some embodiments, anchors such as the first spike 160 and the second spike 162 may be housed in the inserter 108, and may deploy out of the inserter 108 and through the body 110, into the surrounding bone.

In the exemplary embodiment of FIG. 1, the cartridge 104 may further have a third spike 170, a fourth spike 172, and a second deployment mechanism 174 positioned on the opposing side of the body 150. Like the first spike 160 and the second spike 162, the third spike 170 and the fourth spike 172 may be smooth, curvilinear, and/or tapered. The third spike 170 and the fourth spike 172 may be deployable through the other of the proximal openings 126 and the other of the distal openings 128, respectively, through the use of the second deployment mechanism 174. If desired, the first deployment mechanism 164 and the second deployment mechanism 174 may be linked such that they are actuated by the same input (for example, delivered by the inserter 108 or another deployment tool). Alternatively, the second deployment mechanism 174 may also be omitted, in favor of direct engagement of the third spike 170 and the fourth spike 172 by the inserter 108 or another deployment tool. In the alternative, the third spike 170 and the fourth spike 172 may also be housed in the inserter 108 and delivered from the inserter 108 through the body 110 and into the surrounding bone.

As mentioned previously, the cartridge 104 may be designed such that the first spike 160, the second spike 162, the third spike 170, and the fourth spike 172 deploy from within the interior cavity 122 of the body 110. Thus, upon insertion of the cartridge 104 into the interior cavity 122, the first spike 160 and the third spike 170 may be aligned with the proximal openings 126 of the body 110, and the second spike 162 and the fourth spike 172 may be aligned with the distal openings 128 of the body 110.

The first spike 160, the second spike 162, the third spike 170, and the fourth spike 172 may deploy in any of a wide variety of ways, including translation, rotation, and combinations thereof. In some embodiments, the first spike 160, the second spike 162, the third spike 170, and the fourth spike 172 may each be rotatably coupled to the cartridge 104 about a center of rotation, which may be located at or near the center of curvature of the first spike 160, the second spike 162, the third spike 170, and the fourth spike 172, respectively. Thus, the first spike 160, the second spike 162, the third spike 170, and the fourth spike 172 may each form a progressively widening hole in the bone surrounding the implant 102 as they are deployed into the bone.

However, in alternative embodiments, in place of simple rotation, spikes may deploy via translation or more complex motion. In some embodiments, anchors in the form of straight (i.e., rectilinear) spikes may be used. Such spikes may be tapered, or may have a constant cross-sectional size. Such spikes may deploy along straight lines, for example, parallel to the axis of each spike. In yet other embodiments, deployment may consist of a combination of translation and rotation. For example, each of a set of curved or straight spikes may be coupled to a four-bar linkage or other mechanism that drives the spike into the surrounding bone with a combination of translation and rotation.

In some embodiments, the anchors may deploy in such a manner that they provide some compression between the sacrum and the ilium. For example, with reference to FIG. 1, the first spike 160 and the fourth spike 172 may rotate outward, into the bone, and then continue rotating toward each other such that they effectively urge the surrounding bone of the ilium against the surrounding bone of the sacrum. The second spike 162 and the third spike 170 may move toward each other during deployment in a similar manner. Likewise, in embodiments in which spikes deploy via translation, the spikes near the distal ends of the implant may translate or otherwise move toward the spikes near the proximal end, causing compression between the ilium and the sacrum.

In either case, such compression may help to stabilize the implant, and more effectively immobilize the ilium relative to the sacrum. However, in alternative embodiments, deployment may urge the ilium and the sacrum away from each other, providing distraction between the bones.

In some embodiments, anchors may be deployed simultaneously from opposite ends and/or opposite sides of an implant such that the implant tends to stay in place. For example, the first spike 160, the second spike 162, the third spike 170, and the fourth spike 172 may deploy substantially simultaneously from the proximal end 112 and the distal end 114 of the body 110, and from opposite sides of the body 110 (i.e., the top and bottom sides of the body 110 in FIG. 1). Thus, when one anchor presses against the bone, the resulting pressure on the body 110 may be countered by opposing force from another deploying anchor positioned on the opposite side of the body 110, urging the body 110 to move in the opposite direction.

In the embodiment of FIG. 1, the first spike 160 and the third spike 170 deploy proximate the proximal end 112, and the second spike 162 and the fourth spike 172 deploy proximate the distal end 114. In alternative embodiments, anchors (not shown) may be positioned at other positions along the length of the body of the implant, such as between the proximal end and the distal end of the implant body. In some embodiments, the anchors may be designed to deploy out of the openings 176 in the body 110, for example, by passing distally and proximally out of the openings 176, and then translating and/or rotating outward, into the surrounding bone.

If desired, the body 110 may have one or more retention features (not shown) designed to hold the first spike 160, the second spike 162, the third spike 170, and/or the fourth spike 172 in place after deployment. For example, one or more spring-operated latches or the like may translate or rotate into place after deployment of the first spike 160, the second spike 162, the third spike 170, and the fourth spike 172 to block withdrawal of the first spike 160, the second spike 162, the third spike 170, and the fourth spike 172 back into the interior cavity 122 of the body 110. Such retention features may be mechanically movable relative to the body 110, but in the alternative, may instead be stationary features such as detents, flexible snap fittings, and/or the like, that deform to accommodate deployment of the first spike 160, the second spike 162, the third spike 170, and the fourth spike 172, and then snap into place after deployment to prevent reversal of the deployment process.

Such retention features may be carried on the body 110, or if the cartridge 104 is to remain in place within the interior cavity 122, on the cartridge 104. Alternatively, such retention features may be carried on the anchors. For example, each of the first spike 160, the second spike 162, the third spike 170, and the fourth spike 172 may have a circumferential flange positioned near the proximal end of the spike, with a tapered diameter that increases toward the proximal end. The circumferential flange may be slightly larger than the proximal openings 126 and/or the distal openings 128, such that urging the spike through the corresponding one of the proximal openings 126 and the distal openings 128 may deflect the circumferential flange to permit the circumferential flange to pass through the opening, and then snap back into a relaxed state in which it is unable to be withdrawn back through the opening.

In some embodiments, interlocking or otherwise cooperative retention features may be carried on an implant, a cartridge, and/or an anchor. One example will be shown and described in connection with FIGS. 6A and 6B.

Figure 6A:
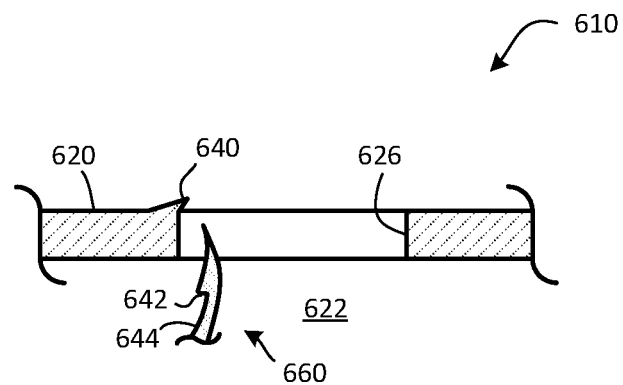
FIGS. 6A and 6B are side elevation, section views of a body of an implant according to an alternative embodiment, in retracted and deployed configurations, respectively, according to one embodiment.
Figure 6B:
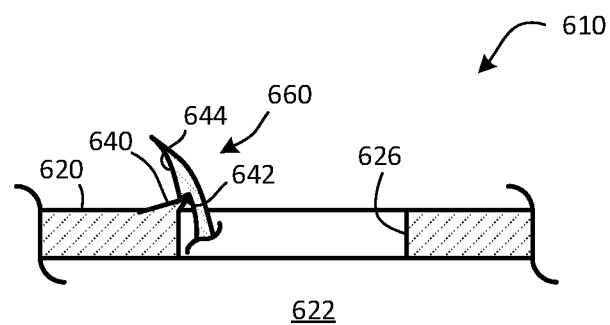

FIGS. 6A and 6B are side elevation, section views of a body 610 of an implant according to an alternative embodiment, in retracted and deployed configurations, respectively, according to one embodiment. As shown, the body 610 has an exterior surface 620, and interior cavity 622, and an opening 626 through which a spike 660 deploys from the interior cavity 622 to the exterior of the body 610. The exterior surface 620 may be shaped to provide a retention feature in the form of a first barb 640 adjacent to the opening

626. The spike 660 may also have a retention feature in the form of a second barb 642 on an edge 644 adjacent to the first barb 640.

As the spike 660 moves from the retracted position of FIG. 6A to the deployed position of FIG. 6B, the spike 660 may move outward through the opening 626. The edge 644 may slide against the first barb 640 until the second barb 642 passes beyond the first barb 640. The second barb 642 may then interlock with the first barb 640, as shown in FIG. 6B, to prevent withdrawal of the spike 660 back into the interior cavity 622 of the body 610.

Returning to FIG. 1, in addition to or in the alternative to the use of such retention features, the deployment mechanism(s) (for example, with reference to FIG. 1, the first deployment mechanism 164 and the second deployment mechanism 174) may remain in place after deployment, and may continue to retain the anchors (for example, the first spike 160, the second spike 162, the third spike 170, and the fourth spike 172 of FIG. 1) to provide an anti-backout function, effectively keeping the first spike 160, the second spike 162, the third spike 170, and the fourth spike 172 in the deployed state.

As yet another alternative to use of such retention features, a separate element (not shown) may be used to keep the anchors deployed. For example, if the cartridge 104 is to be removed, a retention block (not shown) may be inserted after removal of the cartridge 104. The retention block may have surface features shaped to slide into place, in response to insertion of the retention block into the interior cavity 122, in order to block withdrawal of the first spike 160, the second spike 162, the third spike 170, and the fourth spike 172. Such surface features may, for example, abut the proximal ends of the first spike 160, the second spike 162, the third spike 170, and the fourth spike 172 to obstruct motion of the first spike 160, the second spike 162, the third spike 170, and the fourth spike 172 back into the interior cavity 122.

In some embodiments, the anchors may include screws in place of or in addition to spikes. Such screws may be deployed via rotation and translation into the bone, such that the screws engage the bone in a manner similar to that of traditional bone screws. Where screws are used, one or more deployment mechanisms may be used to provide the desired combination of rotation and translation for each screw.

Optionally, the cartridge 104 may have one or more features (not shown) that engage the interior cavity 122, or corresponding features (not shown) of the body 110, residing in the interior cavity 122, to secure the cartridge 104 relative to the body 110. Such engagement may be permanent if the cartridge 104 is to be left in place within the interior cavity 122, or may be temporary, if the cartridge 104 is to be detached and removed from the body 110 after deployment of the first spike 160, the second spike 162, the third spike 170, and the fourth spike 172. Any known type of attachment may be used to couple the cartridge 104 to the body 110, including but not limited to welding, chemical bonding, adhesive bonding, and mechanical fastening.

In some embodiments, a cartridge may not be included as a separate element. Rather, the cartridge may be incorporated into the inserter or another tool, which may carry the anchors and deploy them into the bone surrounding the implant. In the alternative, the cartridge may be permanently integrated into the implant. In any case, it may be desirable to preload the anchors into the cartridge, so that the anchors are delivered to the implantation site with the cartridge. In some embodiments, the anchors may be sterile packed within the cartridge. The implant may be packaged separately from, or together with, the cartridge.

The body 110 may optionally be designed to permit bone in-growth to occur through the interior cavity 122. Thus, the body 110 may advantageously have multiple openings that provide access to the interior cavity 122. In particular, the interior cavity 122 may be accessible through openings 176 at the proximal end 112 and the distal end 114 of the body 110. If desired, the interior cavity 122 may further be accessible through the proximal openings 126 and/or the distal openings 128, which may optionally be over-sized so that they can receive growing bone tissue in addition to the first spike 160, the second spike 162, the third spike 170, and the fourth spike 172. Yet further, the body 110 may have one or more other openings (not shown) passing through the thickness between the exterior surface 120 and the interior cavity 122 to accommodate bone in-growth. Further, if desired, the interior cavity 122 and/or the cartridge 104 (if it is to remain in place after deployment of the first spike 160, the second spike 162, the third spike 170, and the fourth spike 172) may have a receptacle (not shown) to receive bone graft or other material designed to foster such bone in-growth.

The implant 102 and the cartridge 104 may be formed of any of a variety of materials. The implant 102 and the first spike 160, the second spike 162, the third spike 170, and the fourth spike 172 may advantageously be formed of biocompatible materials such as Titanium, Titanium alloys, PEEK, Nitinol, and the like. In embodiments in which the cartridge 104 is to remain at the implantation site, the cartridge 104 may be formed of a biocompatible material. Where the cartridge 104 is to be removed, the cartridge 104 may optionally be disposable. In such embodiments, the cartridge 104 may be made of cheaper and/or less durable materials consistent with the single-use design.

Use of the anchors (in the exemplary embodiment of FIG. 1, the first spike 160, the second spike 162, the third spike 170, and the fourth spike 172) may provide more secure bone fixation. Thus, in some embodiments, only one implant, such as the implant 102, may need to be placed. This may be a significant benefit over known procedures that require the use of multiple discrete implants to properly stabilize the ilium relative to the sacrum. In alternative embodiments, multiple implants 102 may be used to fix the ilium and the sacrum together.

In some embodiments, an expanding implant may be used. For example, in place of the implant 102, an implant may be designed to expand proximally-distally (for example, with a set of telescoping tubes that can be inserted in a short configuration and then expanded) and/or perpendicular to the implant axis (for example, with a cylindrical or tubular implant formed of two or more sectors that can be inserted with a cylindrical profile, and then expanded outward relative to each other, like a collet, to more firmly engage the surrounding bone). Such an expanding implant may be used in combination with deploying anchors as described above.

The drill 106 may be any type of instrument known in the art, for forming holes in bone. The drill 106 may be manually and/or machine-driven, and may have a distal end 182 with one or more cutting features that are able to cut and/or remove bone from a hole.

The inserter 108 may be any type of instrument suitable for retaining and positioning the implant 102. In some embodiments, the inserter 108 may have a handle 190 suitable to be gripped by the hand of a clinician, with a shaft having a distal end 192 shaped to be coupled to the implant 102 and/or the cartridge 104. The distal end 192 may have one or more retention features 194 that interface with the retention features 130 of the implant 102 and/or the cartridge 104 such that the inserter 108 can be temporarily coupled to the implant 102 and/or the cartridge 104. The retention features 194 may take the form of smooth or threaded bosses that can be inserted into, and temporarily retained within, the retention features 130 of the implant 102 and the cartridge 104. A suitable interlock mechanism (such as engaging threads, expanding collets, and/or the like) may be used to temporarily retain the retention features 194 within the retention features 130.

The retention features 130 and the retention features 194 are merely exemplary. In alternative embodiments, the inserter 108 may have retention features (not shown) in the form of one or more holes, and the implant 102 and/or the cartridge 104 may have retention features (not shown) in the form of one or more posts insertable into the holes of the inserter 108. In yet other embodiments, entirely different retention features may be used on the inserter 108, the implant 102, and/or the cartridge 104. Any type of feature known in the art, for temporarily securing an implant to an inserter, may be used.

In some embodiments, it may be necessary to revise a procedure in which the implant 102 is implanted. For example, if a union does not properly form between the sacrum and the ilium, it may be necessary to remove the implant 102 in favor of an alternative procedure. In such embodiments, it may be necessary to release any retention features that keep the first spike 160, the second spike 162, the third spike 170, and the fourth spike 172 in the deployed state, and/or remove bone that has formed within the interior cavity 122 in order to allow the first spike 160, the second spike 162, the third spike 170, and the fourth spike 172 to be withdrawn back into the interior cavity 122. Thus, in some embodiments, a revision tool (not shown) may be inserted into the interior cavity 122 to remove such in-grown bone and/or release such retention features. Such a revision tool may also actuate the first spike 160, the second spike 162, the third spike 170, and the fourth spike 172 in a manner that retracts them back into the interior cavity 122 in order to facilitate removal of the implant 102.

Figure 2:
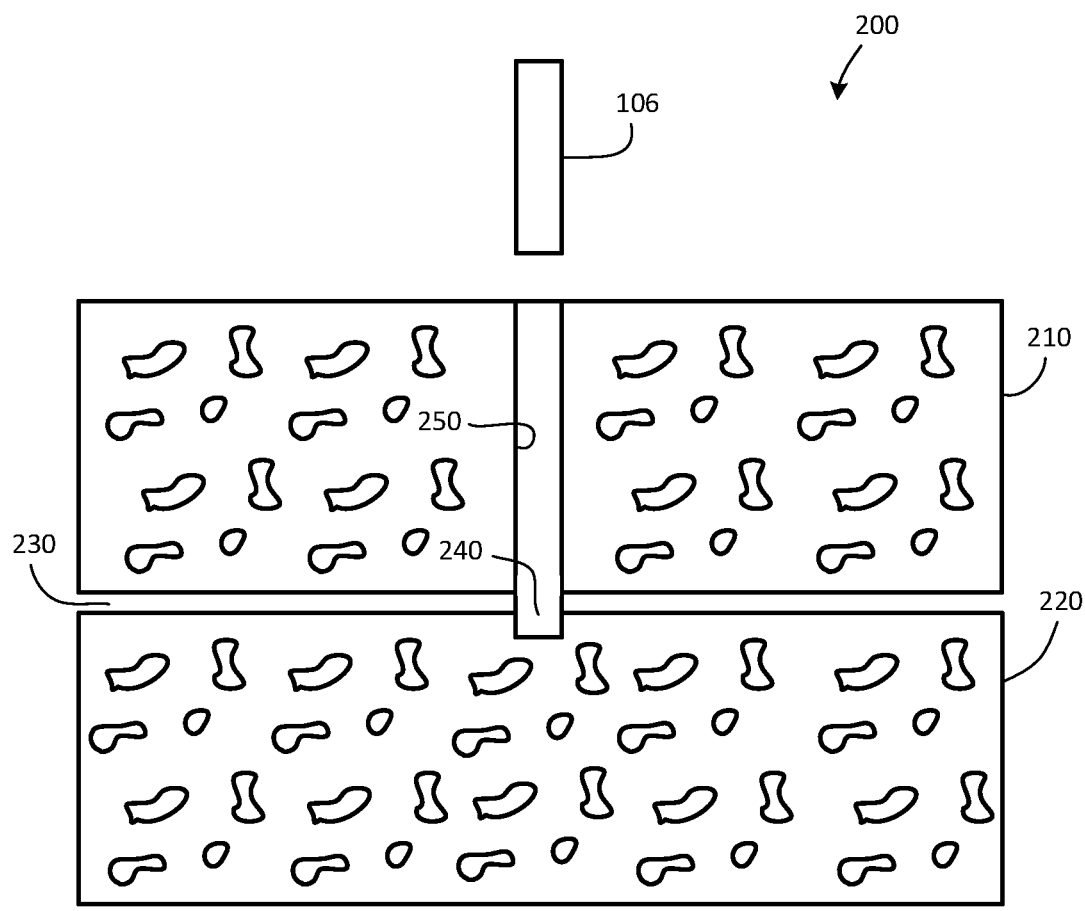
FIG. 2 is a side elevation, section view of an operative site, according to one embodiment.

FIG. 2 is a side elevation, section view of an operative site 200, according to one embodiment. FIG. 2 shows a portion of an ilium 210 and a portion of a sacrum 220, between which a space 230 resides. A portion of the space 230 may be designated as an implantation site 240 at which the implant 102 is to be placed. The implantation site 240 may be accessed via an access pathway 250 formed in the ilium 210, for example, with the drill 106 of FIG. 1. In some embodiments, the access pathway 250 may be formed by simply translating the drill 106 along its axis, in a rotating state, directly into the ilium 210 until the distal end 182 of the drill 106 has reached the implantation site 240. The drill 106 may then be withdrawn back through the access pathway 250 and out of the ilium 210.

If desired, the drill 106 and/or another tool may be designed to preserve some of the bone removed in the process of forming the access pathway 250 and the implantation site 240. This preserved bone may be retained and subsequently inserted into the interior cavity 122 of the implant 102 in order to facilitate bone in-growth. Additionally or alternatively, bone may be harvested from a different part of the body for this purpose.

Figure 3:
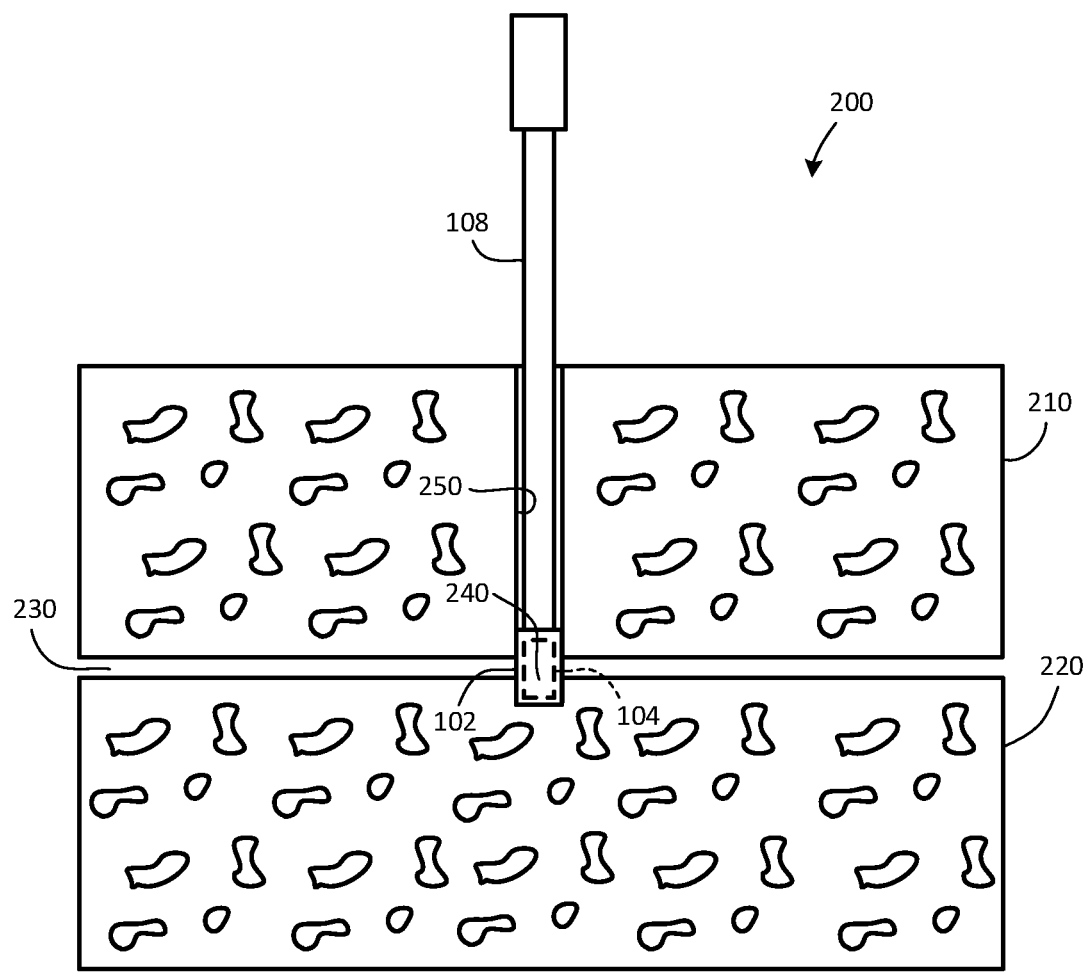
FIG. 3 is a side elevation, partial section view of the operative site of FIG. 2, with the implant of FIG. 1 in the implantation site, according to one embodiment.

FIG. 3 is a side elevation, partial section view of the operative site 200, with the implant 102 in the implantation site 240, according to one embodiment. Specifically, after formation of the access pathway 250, the implant 102 (and optionally, the cartridge 104) may be coupled to the distal end 192 of the inserter 108, and inserted through the access pathway 250 to reach the implantation site 240 (for example, by manually manipulating the handle 190 of the inserter 108). In the exemplary embodiment of FIG. 3, the cartridge 104 is disposed within the interior cavity 122 of the cartridge 104, and is coupled to the inserter 108 and inserted into the implantation site 240 together with the implant 102. The first spike 160, the second spike 162, the third spike 170, and the fourth spike 172 have not yet been deployed.

Figure 4:
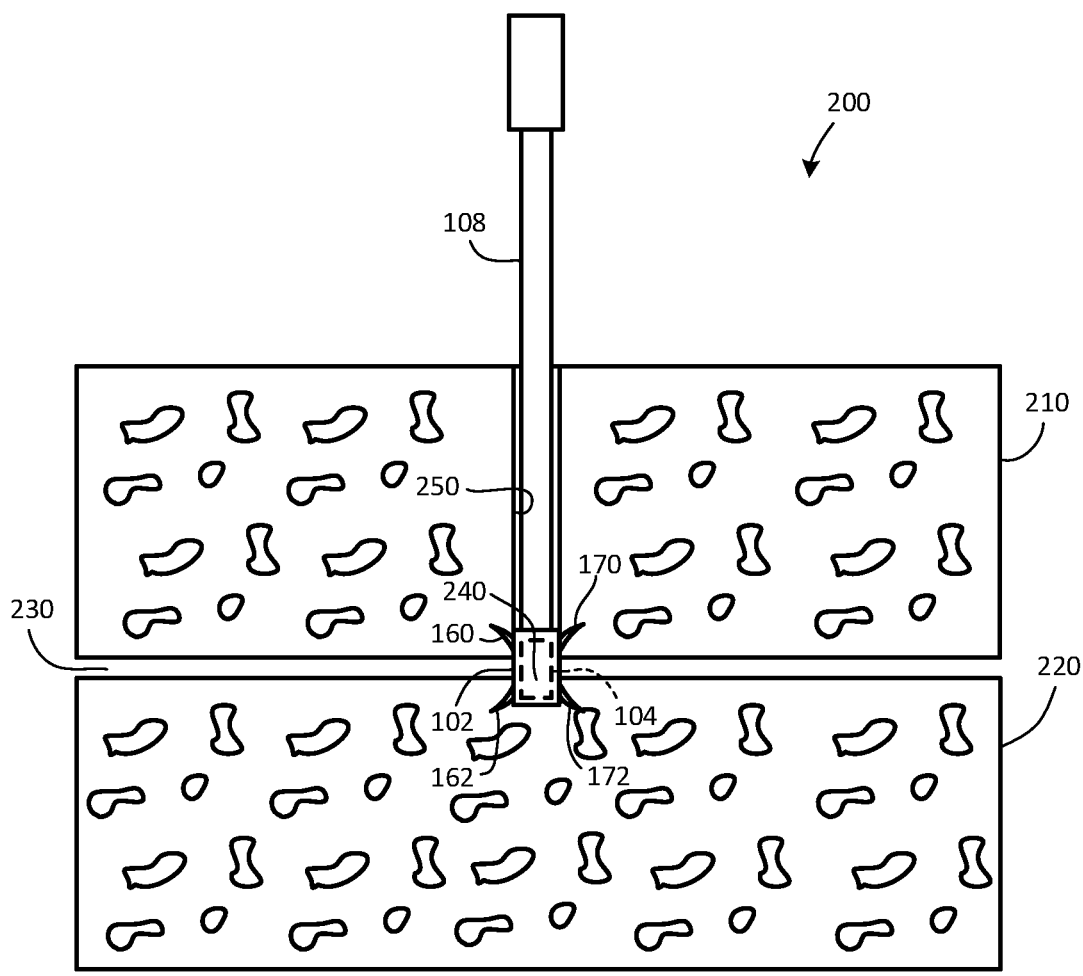
FIG. 4 is a side elevation, partial section view of the operative site of FIG. 2, with the implant of FIG. 1 in the implantation site, and the first spike, the second spike, the third spike, and the fourth spike in the deployed configuration, according to one embodiment.

FIG. 4 is a side elevation, partial section view of the operative site 200, with the implant 102 in the implantation site 240, and the first spike 160, the second spike 162, the third spike 170, and the fourth spike 172 in the deployed configuration, according to one embodiment. An actuator (not shown) on the inserter 108, such as a trigger, knob, button, slider, or the like, may be actuated to actuate the first deployment mechanism 164 and the second deployment mechanism 174, thereby urging the first spike 160, the second spike 162, the third spike 170, and the fourth spike 172 outward, through the proximal openings 126 and the distal openings 128, and into the bone of the ilium 210 and the sacrum 220, surrounding the implant 102.

Figure 5:
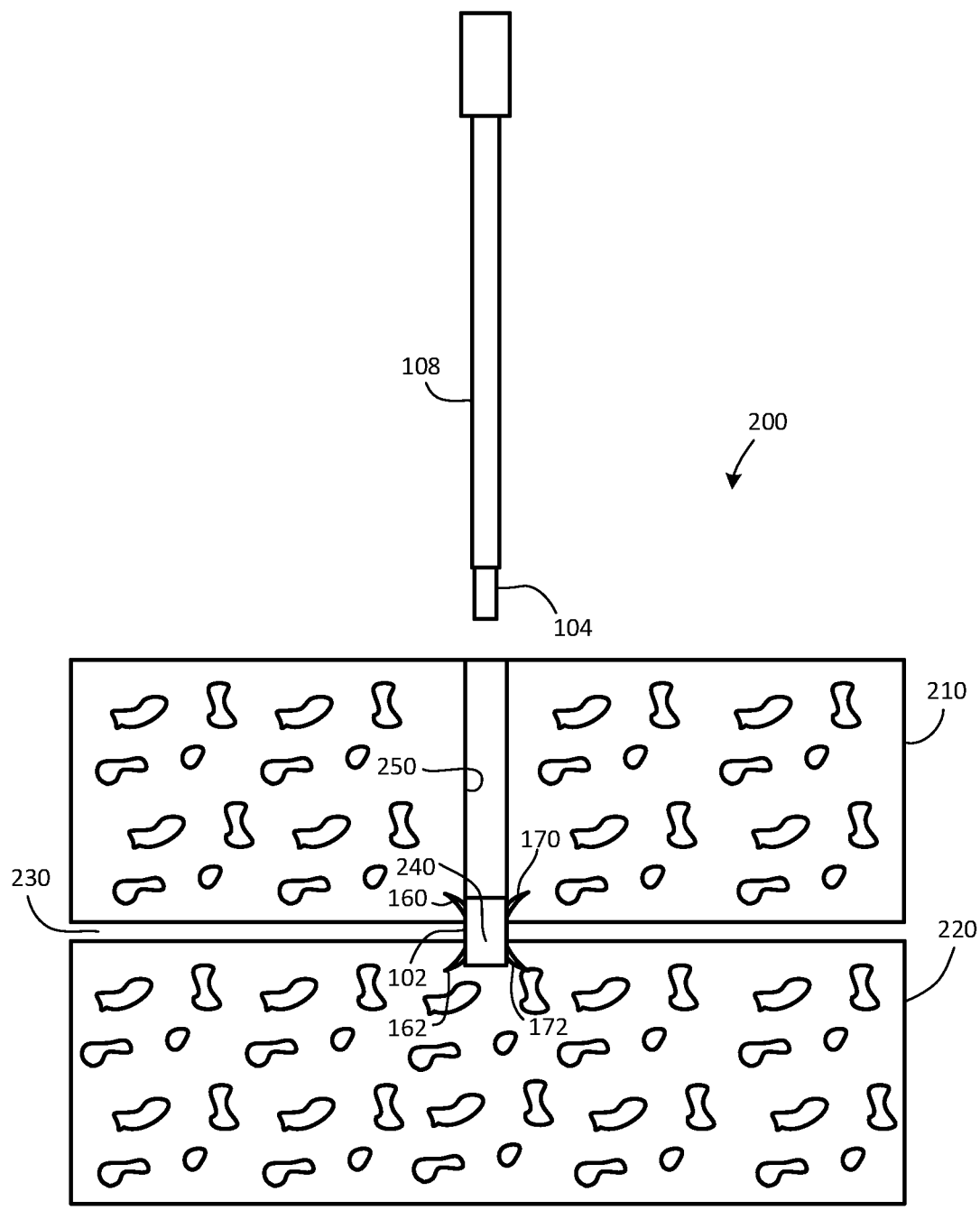
FIG. 5 is a side elevation, partial section view of the operative site of FIG. 2, with the implant of FIG. 1 in the implantation site, the first spike, the second spike, the third spike, and the fourth spike deployed, and the cartridge and the inserter removed, according to one embodiment

FIG. 5 is a side elevation, partial section view of the operative site 200, with the implant 102 in the implantation site 240, the first spike 160, the second spike 162, the third spike 170, and the fourth spike 172 deployed, and the cartridge 104 and the inserter 108 removed, according to one embodiment. Specifically, after deployment of the first spike 160, the second spike 162, the third spike 170, and the fourth spike 172, the inserter 108 and the cartridge 104 may be detached from the implant 102. This may be done, for example, by actuating another actuator (not shown) on the inserter 108, such as a trigger, knob, button, slider, or the like, to decouple the cartridge 104 from the implant 102 and disengage the retention features 194 of the inserter 108 from the retention features 130 of the implant 102. The inserter 108 may then be withdrawn back through the access pathway 250 with the cartridge 104 still attached, such that the cartridge 104 is also withdrawn through the access pathway 250.

The first spike 160, the second spike 162, the third spike 170, and the fourth spike 172 may remain in the deployed configuration, and may effectively anchor the implant 102 in the ilium 210 and the sacrum 220. If needed, a retention block or other feature (not shown) may be inserted into the interior cavity 122 of the implant 102, for example, with the inserter 108 or with a different inserter. Additionally or alternatively, bone graft or other material (not shown) may be inserted into the interior cavity 122 to facilitate bone in-growth through the interior cavity 122 of the implant 102. In some embodiments, a retention block may carry such material, thereby keeping the first spike 160, the second spike 162, the third spike 170, and the fourth spike 172 deployed and facilitating bone in-growth with one insertion step. All instruments may then be removed, and the surgical wound may be closed.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles set forth herein.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the methods and systems of the present disclosure set forth herein without departing from it spirit and scope.

The invention claimed is:

1. A method for securing an ilium to a sacrum, the method comprising:
   providing an access pathway to an implantation site between the ilium and the sacrum;
   inserting an implant through the access pathway, the implant comprising:
      a body comprising an exterior surface with threads, the body defining a longitudinal axis;
      an interior body within the body;
      a first deployment mechanism on one side of the interior body, wherein the first deployment mechanism comprises:
         a first anchor;
         a second anchor; and
         a first hub operatively connected to the first anchor and the second anchor;
      a second deployment mechanism on a second, opposing side of the interior body, wherein the second deployment mechanism comprises:
         a third anchor;
         a fourth anchor; and
         a second hub operatively connected to the third anchor and the fourth anchor;
      wherein the interior body is insertable into the body with the first deployment mechanism and the second deployment mechanism in a stowed position; wherein, in the stowed position, the first deployment mechanism including the first and second anchors, and the second deployment mechanism including the third and fourth anchors, each has an overall height and an overall length that are less than a height and a length, respectively, of the interior body so that the first and second deployment mechanisms are within a perimeter of the interior body;
   rotating the implant such that the threads engage bone surrounding the access pathway to position the implant at the implantation site; and
   rotating the first hub and the second hub about an axis perpendicular to the longitudinal axis to deploy the first anchor, the second anchor, the third anchor, and the fourth anchor-outward from the body and into the ilium and the sacrum proximate the implant to retain the implant relative to the ilium and the sacrum.

2. The method of claim 1, wherein:
   the providing of the access pathway comprises forming the access pathway through the ilium to reach the sacrum; and
   the positioning of the implant at the implantation site comprises:
      positioning a distal end of the implant within the sacrum; and
      positioning a proximal end of the implant within the ilium.

3. The method of claim 1, wherein:
   the body defines an interior cavity within which the interior body resides; and
   the deploying of the first anchor, the second anchor, the third anchor, and the fourth anchor outward from the body comprises moving distal ends of the first anchor, the second anchor, the third anchor, and the fourth anchor out of the interior cavity and into the ilium and the sacrum.

4. The method of claim 3, wherein:
   the interior body comprises a cartridge; and
   the positioning of the implant at the implantation site comprises positioning the cartridge, carrying the first anchor, the second anchor, the third anchor, and the fourth anchor and carried within the interior cavity, at the implantation site; and
   the deploying of the first anchor, the second anchor, the third anchor, and the fourth anchor outward from the body comprises deploying the first anchor, the second anchor, the third anchor, and the fourth anchor outward from the cartridge.

5. A method for securing an ilium to a sacrum, the method comprising:
   providing an access pathway to an implantation site between the ilium and the sacrum;
   inserting an implant through the access pathway, the implant comprising:
      a body comprising an interior cavity and an exterior surface with threads, the body defining a longitudinal axis;
      an interior body positioned within the body such that the interior body divides the interior cavity into:
         a first compartment; and
         a second compartment on an opposite side of the longitudinal axis from the first compartment;
      a first deployment mechanism in the first compartment, wherein the first deployment mechanism comprises:
         a first anchor; and
         a second anchor; and a second deployment mechanism in the second compartment, wherein the second deployment mechanism comprises:
    a third anchor; and
    a fourth anchor;
wherein the interior body is insertable into the body with the first deployment mechanism and the second deployment mechanism in a stowed position; wherein, in the stowed position, the first deployment mechanism including the first and second anchors, and the second deployment mechanism including the third and fourth anchors, each has an overall height and an overall length that are less than a height and a length, respectively, of the interior body so that the first and second deployment mechanisms are within a perimeter of the interior body;
rotating the implant such that the threads engage bone surrounding the access pathway to position the implant at the implantation site; and
deploying the first anchor, the second anchor, the third anchor, and the fourth anchor-outward from the body and into the ilium and the sacrum proximate the implant to retain the implant relative to the ilium and the sacrum.

6. The method of claim 5, wherein:
the providing of the access pathway comprises forming the access pathway through the ilium to reach the sacrum; and
the positioning of the implant at the implantation site comprises:
    positioning a distal end of the implant within the sacrum; and
    positioning a proximal end of the implant within the ilium.

7. The method of claim 5, wherein:
the deploying of the first anchor, the second anchor, the third anchor, and the fourth anchor outward from the body comprises moving distal ends of the first anchor, the second anchor, the third anchor, and the fourth anchor out of the interior cavity and into the ilium and the sacrum.

8. The method of claim 7, wherein:
the interior body comprises a cartridge; and
the positioning of the implant at the implantation site comprises positioning the cartridge, carrying the first anchor, the second anchor, the third anchor, and the fourth anchor and carried within the interior cavity, at the implantation site; and
the deploying of the first anchor, the second anchor, the third anchor, and the fourth anchor outward from the body comprises deploying the first anchor, the second anchor, the third anchor, and the fourth anchor outward from the cartridge.

9. A method for securing an ilium to a sacrum, the method comprising:
providing an access pathway to an implantation site between the ilium and the sacrum;
inserting an implant through the access pathway, the implant comprising:
    a body comprising an exterior surface with threads, the body defining a longitudinal axis extending along and within a plane;
    an interior body within the body;
    wherein the exterior surface is interrupted by:
        a first window;
        a second window;
        a third window; and
        a fourth window;
    a first deployment mechanism on a first side of the plane, wherein the first deployment mechanism comprises:
        a first anchor; and
        a second anchor; and
    a second deployment mechanism on a second side of the plane, opposite to the first side, wherein the second deployment mechanism comprises:
        a third anchor; and
        a fourth anchor;
wherein the interior body is insertable into the body with the first deployment mechanism and the second deployment mechanism in a stowed position; wherein, in the stowed position, the first deployment mechanism including the first and second anchors, and the second deployment mechanism including the third and fourth anchors, each has an overall height and an overall length that are less than a height and a length, respectively, of the interior body so that the first and second deployment mechanisms are within a perimeter of the interior body;
rotating the implant such that the threads engage bone surrounding the access pathway to position the implant at the implantation site; and
deploying the first deployment mechanism and the second deployment mechanism to deploy the first anchor, the second anchor, the third anchor, and the fourth anchor outward from the body through the first window, the second window, the third window, and the fourth window, respectively, and into the ilium and the sacrum proximate the implant to retain the implant relative to the ilium and the sacrum;
wherein:
    the first window and the second window are on the first side of the plane; and
    the third window and the fourth window are on the second side of the plane.

10. The method of claim 9, wherein:
the providing of the access pathway comprises forming the access pathway through the ilium to reach the sacrum; and
the positioning of the implant at the implantation site comprises:
    positioning a distal end of the implant within the sacrum; and
    positioning a proximal end of the implant within the ilium.

11. The method of claim 9, wherein:
the body defines an interior cavity within which the interior body, the first deployment mechanism, and the second deployment mechanism reside; and
the deploying of the first anchor, the second anchor, the third anchor, and the fourth anchor outward from the body comprises moving distal ends of the first anchor, the second anchor, the third anchor, and the fourth anchor out of the interior cavity and into the ilium and the sacrum.

12. The method of claim 11, wherein:
the interior body comprises a cartridge; and
the positioning of the implant at the implantation site comprises positioning the cartridge, carrying the first anchor, the second anchor, the third anchor, and the fourth anchor and carried within the interior cavity, at the implantation site; and the deploying of the first anchor, the second anchor, the third anchor, and the fourth anchor outward from the body comprises deploying the first anchor, the second anchor, the third anchor, and the fourth anchor outward from the cartridge.

13. A method for securing an ilium to a sacrum, the method comprising:

providing an access pathway to an implantation site between the ilium and the sacrum;

coupling an implant to a distal end of an inserter;

inserting the implant through the access pathway, the implant comprising:
- a body comprising an exterior surface with threads, the body comprising a first retention feature;
- an interior body positioned within the body, the interior body comprising a second retention feature;
- a first deployment mechanism coupled to the interior body, wherein the first deployment mechanism comprises:
  - a first anchor; and
  - a second anchor; and
- a second deployment mechanism coupled to the interior body, wherein the second deployment mechanism comprises:
  - a third anchor; and
  - a fourth anchor;

wherein the interior body is insertable into the body with the first deployment mechanism and the second deployment mechanism in a stowed position; wherein, in the stowed position, the first deployment mechanism including the first and second anchors, and the second deployment mechanism including the third and fourth anchors, each has an overall height and an overall length that are less than a height and a length, respectively, of the interior body so that the first and second deployment mechanisms are within a perimeter of the interior body;

rotating the implant such that the threads engage bone surrounding the access pathway to position the implant at the implantation site; and deploying the first anchor, the second anchor, the third anchor, and the fourth anchor outward from the body and into the ilium and the sacrum proximate the implant to retain the implant relative to the ilium and the sacrum;

wherein the coupling of the implant to the distal end comprises coupling the distal end to the first retention feature and the second retention feature.

14. The method of claim 13, wherein:

the providing of the access pathway comprises forming the access pathway through the ilium to reach the sacrum; and the positioning of the implant at the implantation site comprises:

positioning a distal end of the implant within the sacrum; and positioning a proximal end of the implant within the ilium.

15. The method of claim 13, wherein:

the body defines an interior cavity within which the interior body resides; and the deploying of the first anchor, the second anchor, the third anchor, and the fourth anchor outward from the body of the implant comprises moving distal ends of the first anchor, the second anchor, the third anchor, and the fourth anchor out of the interior cavity and into the ilium and the sacrum.

16. The method of claim 15, wherein:

the interior body comprises a cartridge; and the positioning of the implant at the implantation site comprises positioning the cartridge, carrying the first anchor, the second anchor, the third anchor, and the fourth anchor and carried within the interior cavity, at the implantation site; and the deploying of the first anchor, the second anchor, the third anchor, and the fourth anchor outward from the body comprises deploying the first anchor, the second anchor, the third anchor, and the fourth anchor outward from the cartridge.

\* \* \* \* \*